(12) United States Patent
Lejon et al.

(10) Patent No.: US 11,578,683 B2
(45) Date of Patent: Feb. 14, 2023

(54) PRE-CHAMBER ARRANGEMENT FOR A GAS ENGINE AND A GAS ENGINE

(71) Applicant: Scania CV AB, Södertälje (SE)

(72) Inventors: Svante Lejon, Huddinge (SE); Pål Axelsson, Tyresö (SE)

(73) Assignee: Scania CV AB, Södertälje (SE)

( * ) Notice: Subject to any disclaimer, the term of this patent is extended or adjusted under 35 U.S.C. 154(b) by 12 days.

(21) Appl. No.: 17/280,214

(22) PCT Filed: Oct. 7, 2019

(86) PCT No.: PCT/SE2019/050971
§ 371 (c)(1),
(2) Date: Mar. 26, 2021

(87) PCT Pub. No.: WO2020/076221
PCT Pub. Date: Apr. 16, 2020

(65) Prior Publication Data
US 2022/0034282 A1     Feb. 3, 2022

(30) Foreign Application Priority Data
Oct. 11, 2018 (SE) .................................. 1851242-6

(51) Int. Cl.
*F02M 21/04* (2006.01)
*F02B 19/10* (2006.01)
(Continued)

(52) U.S. Cl.
CPC ........... *F02M 21/04* (2013.01); *F02B 19/108* (2013.01); *F02M 21/0239* (2013.01); *F02B 43/00* (2013.01); *F02B 2710/00* (2013.01)

(58) Field of Classification Search
CPC .... F02M 21/04; F02M 21/0239; F02B 19/108
See application file for complete search history.

(56) References Cited

U.S. PATENT DOCUMENTS

| | | | | |
|---|---|---|---|---|
| 3,154,058 A | * | 10/1964 | Warren | F02B 19/12 123/259 |
| 3,661,125 A | * | 5/1972 | Stumpfig | F02M 57/06 123/275 |

(Continued)

FOREIGN PATENT DOCUMENTS

| | | |
|---|---|---|
| CN | 206319953 U | 7/2017 |
| CN | 107429602 A | 12/2017 |

(Continued)

OTHER PUBLICATIONS

Feb. 15, 2022—(CN) First Office Action—App. No. 201980065385.0.

(Continued)

*Primary Examiner* — Xiao En Mo
(74) *Attorney, Agent, or Firm* — Banner & Witcoff, Ltd.

(57) ABSTRACT

A pre-chamber arrangement (100) for a gas engine (1), including a pre-chamber body (20) accommodating a volume (30); and an inlet passage (40) with an inlet port (42), for supplying a gaseous medium (50) into the pre-chamber volume (30); the pre-chamber volume (30) extends in a longitudinal direction (L) between a top end (32) and a bottom end (34); the pre-chamber volume (30) is configured to accommodate an end of a spark plug (60) at the top end (32) and at the bottom end (34), the pre-chamber body (20) has openings (26) for allowing gas to flow between the pre-chamber volume (30) and a main combustion chamber (10) of the gas engine (1); the inlet port (42) is positioned, at a distance (D) from the top end (32) of the pre-chamber volume (30), in the longitudinal direction (L), such that a volume of residual gases is trapped at the top end of the pre-chamber volume when the gaseous medium is supplied into the pre-chamber volume during an intake stroke.

9 Claims, 4 Drawing Sheets

(51) Int. Cl.
*F02M 21/02* (2006.01)
*F02B 43/00* (2006.01)

(56) References Cited

U.S. PATENT DOCUMENTS

| | | | |
|---|---|---|---|
| 3,809,039 A | 5/1974 | Alquist | 123/119 A |
| 3,824,965 A * | 7/1974 | Clawson | F02B 19/1085 123/275 |
| 3,970,054 A * | 7/1976 | Henault | F02B 19/108 239/87 |
| 4,098,232 A * | 7/1978 | Gleiter | F02B 19/1004 123/286 |
| 4,903,656 A | 2/1990 | Nakazono et al. | |
| 5,222,993 A | 6/1993 | Crane | 123/256 |
| 5,611,307 A * | 3/1997 | Watson | F02B 43/10 123/259 |
| 2007/0169740 A1 * | 7/2007 | Riggs | F02B 19/1004 123/266 |
| 2009/0118986 A1 * | 5/2009 | Kita | F02D 37/02 701/105 |
| 2010/0037859 A1 * | 2/2010 | Mashiki | F02D 35/027 123/436 |
| 2011/0297121 A1 | 12/2011 | Kraus et al. | 123/260 |
| 2013/0233273 A1 * | 9/2013 | Redtenbacher | F02B 19/108 123/253 |
| 2014/0138454 A1 * | 5/2014 | Sturman | F02M 51/061 239/5 |
| 2014/0251259 A1 * | 9/2014 | Dumser | F02M 21/0281 123/260 |
| 2016/0053668 A1 | 2/2016 | Loetz et al. | |
| 2016/0053671 A1 | 2/2016 | Sotiropoulou et al. | |
| 2016/0069250 A1 * | 3/2016 | Loetz | F02B 19/02 123/292 |
| 2016/0195003 A1 * | 7/2016 | Könczöl | F02M 45/08 123/253 |
| 2016/0341105 A1 * | 11/2016 | Gu | F02B 19/10 |

FOREIGN PATENT DOCUMENTS

| | | |
|---|---|---|
| CN | 107636275 A | 1/2018 |
| DE | 448043 C | 8/1927 |
| EP | 3255744 A1 | 12/2017 |
| WO | 2011015329 A1 | 2/2011 |
| WO | WO 2011/015329 A1 | 2/2011 |

OTHER PUBLICATIONS

Novelty Search Report dated May 16, 2018.
Office Action dated Apr. 1, 2019 in corresponding Swedish Patent Application No. 1851242-6.
Office Action dated Dec. 20, 2019 in corresponding Swedish Patent Application No. 1851242-6.
International Search Report dated Jan. 9, 2020 in corresponding PCT International Application No. PCT/SE2019/050971.
Written Opinion dated Jan. 9, 2020 in corresponding PCT International Application No. PCT/SE2019/050971.
Jun. 15, 2022—(EP) Extended Search Report—App. No. 19871462.8.

* cited by examiner

PRE-CHAMBER ARRANGEMENT FOR A GAS ENGINE AND A GAS ENGINE

CROSS-REFERENCE TO RELATED APPLICATIONS

The present application is a 35 U.S.C. §§ 371 national phase conversion of PCT/SE2019/050971, filed Oct. 7, 2019, the contents of which are incorporated herein by reference, which claims priority of Swedish Patent Application No. 1851242-6 filed Oct. 11, 2018, the contents of which are incorporated by reference herein. The PCT International Application was published in the English language.

TECHNICAL FIELD

The present invention relates to a pre-chamber arrangement for a gas engine. The invention also relates to a method for combustion in a pre-chamber arrangement and a gas engine comprising such an arrangement.

BACKGROUND

Combustion engines operating on gaseous fuels are spark ignited and are typically used for stationary applications. Such gas engines may be used for power generation and may, for example, operate on gas from digesters and sewage systems, natural gas or any other biogas. Heavy-duty gas engines are often lean-burn engines, which means burning of fuel with an excess of air. This results in a lower temperature in the combustion chamber and thereby lower NOx (nitrogen oxide) formation. However, lean burning requires higher ignition/activation energy and pre-chambers are therefore often used. With a pre-chamber, a richer mixture of fuel gas and air is ignited by a spark plug in the pre-chamber. The flaming gas and active components then spreads to the lean mixture in the main combustion chamber of the engine. By using a pre-chamber, less NOx is produced and the thermal efficiency is increased as higher compression ratios are can be used. Typically, fuel gas is fed into the pre-chamber during an intake stroke of the gas engine, which fuel gas is mixed with the lean mixture from the combustion engine during compression stroke. This way, a rich mixture is achieved in the pre-chamber to be ignited by the spark plug.

Using pre-chamber ignition in small gas engines may be difficult since the pre-chamber has to be very compact. Also, achieving accurate mixing proportions in the pre-chamber may be problematic. Document U.S. Pat. No. 4,903,656 A discloses a gas engine with a pre-chamber, where an area of a section of the pre-chamber gradually decreases towards the combustion chamber to achieve a good mixing of the gas in the pre-chamber and the lean mixture in the combustion chamber in a compression stroke.

SUMMARY

Despite known solutions in the field, it would be desirable to develop a pre-chamber arrangement which overcomes or alleviates at least some of the drawbacks of the prior art.

An object of the present invention is thus to achieve an advantageous pre-chamber arrangement, which facilitates and improves the control of the amount of gaseous medium inside the pre-chamber. Another object of the present invention is to achieve a pre-chamber arrangement, which results in lower NOx emissions from the gas engine without the need of exhaust gas aftertreatment for nitrogen oxides.

The herein mentioned objects are achieved by a pre-chamber arrangement, a gas engine comprising such a pre-chamber arrangement, a method for combustion in a pre-chamber arrangement and use of such a pre-chamber arrangement according to the independent claims.

Hence, according to an aspect of the present invention, a pre-chamber arrangement for a gas engine is provided. The pre-chamber arrangement comprises: a pre-chamber body accommodating a volume; and an inlet passage with an inlet port, for supplying a gaseous medium into the pre-chamber volume; wherein the pre-chamber volume extends in a longitudinal direction between a top end and a bottom end, wherein the pre-chamber volume is configured to accommodate an end of a spark plug at the top end and wherein, at the bottom end, the pre-chamber body comprises openings for allowing gas to flow between the pre-chamber volume and a main combustion chamber of the gas engine. Furthermore, the inlet port is positioned, at a distance from the top end of the pre-chamber volume, in the longitudinal direction, such that a volume of residual gases is trapped at the top end of the pre-chamber volume when the gaseous medium is supplied into the pre-chamber volume during an intake stroke.

According to another aspect of the invention, a gas engine comprising such a pre-chamber arrangement is provided.

Pre-chambers for lean-burn gas engines are normally filled with rich fuel gas during an intake stroke in the cylinder associated with the pre-chamber. However, a rich fuel gas cannot be ignited and therefore has to be mixed to increase the amount of air in the fuel gas. Before the fuel gas is supplied into the pre-chamber volume, the pre-chamber volume may comprise residual gases from previous combustions and water. During a compression stroke, the lean gas mixture in the main combustion chamber will be pressed into the pre-chamber volume and be mixed with the rich fuel gas in the pre-chamber volume. The pressure of the cylinder determines how much of the lean gas mixture is entering the pre-chamber volume. The gas mixture in the pre-chamber volume will be richer than the gas mixture in the main combustion engine. It is desired to ignite a gas mixture with an air-fuel ratio lower than a stoichiometric (stoich) mixture in the pre-chamber and it is desired to burn a gas mixture with a large amount of excessive air in the main combustion chamber. The gas mixture in the pre-chamber volume will then be ignited by means of a spark plug producing a small electric spark. Typically, the aim is to get as much combustible gas mixture around the spark plug as possible. The gas mixture of gaseous medium and lean gas mixture in the pre-chamber volume may also be referred to as fuel charge. In order to enable lean burning in the main combustion chamber, higher ignition energy is required. To achieve this, one may control where and how the fuel gas and the lean gas mixture from the main combustion chamber are mixed, and also how fast the gases are mixed. By positioning the inlet port of the inlet passage, so as to reduce the amount of gaseous medium in the pre-chamber volume during an intake stroke according to the invention, a leaner gas mixture/fuel charge can be achieved in the pre-chamber volume. This way, a gas mixture with a controllable lambda level and good ignitability, which is still below stoich mixture and enables lower NOx formation, is achieved in the pre-chamber volume and thus in the main combustion chamber. The position of the inlet port will enable a desired air-fuel ratio of the gas mixture/fuel charge, without the need of precise control of the supply of the gaseous medium into the pre-chamber volume. When a cylinder piston presses a lean gas mixture from the main combustion chamber into the pre-chamber volume with a known pressure, the amount of lean gas mixture entering the pre-chamber volume will also be known. The position of the inlet port will determine the fill ratio of gaseous medium in the pre-chamber volume during an intake stroke and thus the amount of gaseous medium in the pre-chamber volume. The amount of gaseous medium and the amount of lean gas mixture in the pre-chamber volume will determine the air-fuel ratio of the gas mixture/fuel charge in the pre-chamber volume. In prior art, the inlet port is arranged at the top end of the pre-chamber volume, which means that the whole pre-chamber volume is filled with the gaseous medium during an intake stroke. Thus, based on the known amount of lean gas mixture entering the pre-chamber volume, the position of the inlet port will determine the air-fuel ratio of the gas mixture of the gaseous medium and the lean gas mixture from the pre-chamber volume. By changing the position of the inlet port, a desired air-fuel ratio of the gas mixture/fuel charge can be achieved.

The term "position of the inlet port" may in this context refer both to the spatial location of the inlet port relative to the pre-chamber volume as well as the orientation of the inlet port relative to the pre-chamber volume.

Further objects, advantages and novel features of the present invention will become apparent to one skilled in the art from the following details, and also by putting the invention into practice. Whereas the invention is described below, it should be noted that it is not restricted to the specific details described.

Specialists having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various drawings, and in which.

DETAILED DESCRIPTION

To achieve a desired combustion in a lean-burn gas engine with a pre-chamber and to achieve as clean exhaust gas as possible, a desired gas mixture should be achieved in the pre-chamber volume. Achieving a desired gas mixture each time may require complex control of the supply of gaseous medium into the pre-chamber volume and of the lean gas mixture from the main combustion chamber entering the pre-chamber volume. This may be complicated. To achieve a gas engine with a desired combustion and an acceptable NOx emission level, a pre-chamber arrangement according to the disclosure has been developed. The present disclosure is applicable on all sorts of gas engines. The disclosure may relate to stationary gas engines, transport gas engines etc. Specifically, the present disclosure may relate to lean-burn gas engines for power generation.

According to an aspect of the present disclosure, a pre-chamber arrangement for a gas engine is provided. The arrangement comprises: a pre-chamber body accommodating a volume; and an inlet passage with an inlet port, for supplying a gaseous medium into the pre-chamber volume; wherein the pre-chamber volume extends in a longitudinal direction between a top end and a bottom end, wherein the pre-chamber volume is configured to accommodate an end of a spark plug at the top end and wherein, at the bottom end, the pre-chamber body comprises openings for allowing gas to flow between the pre-chamber volume and a main combustion chamber of the gas engine. Furthermore, the inlet port is positioned, so as to reduce the amount of gaseous medium in the pre-chamber volume in an intake stroke. This way, a leaner, yet rich, gas mixture can be achieved in the pre-chamber volume and cleaner exhaust gas is thereby achieved.

It is to be understood that the basic functions of a gas engine and a pre-chamber for spark plug ignition are considered to be known and will not be described in detail herein.

The inlet port may be positioned at a distance from the top end of the pre-chamber volume, in the longitudinal direction. The inlet port may thus be positioned closer to the bottom end of the pre-chamber volume than prior art solutions. By positioning the inlet port at a distance from the top end of the pre-chamber volume, residual gases will be trapped at the top end of the pre-chamber volume. The inlet port may thus be positioned, such that residual gases are trapped in the pre-chamber volume when gaseous medium is supplied into the pre-chamber volume. The inlet port may be positioned to achieve a cushion/cloud of residual gases at the top end of the pre-chamber volume when gaseous medium is supplied into the pre-chamber volume. The pre-chamber arrangement may be configured to supply gaseous medium to the pre-chamber volume during an intake stroke. During the intake stroke, the pressure in the main combustion chamber is lower than the feed pressure of the gaseous medium and will, due to the openings in the pre-chamber body, draw the supplied gaseous medium towards the bottom end of the pre-chamber volume. Thus, the gaseous medium being discharged inside the pre-chamber volume at a distance from the top end will have limited flow upwards from the inlet port to the top end. This way, the top end of the pre-chamber volume will not be filled with the supplied gaseous medium, and the residual gases at the top end of the pre-chamber volume will remain. The inlet port may thus be positioned, such that residual gases surrounds the spark plug when gaseous medium is supplied into the pre-chamber volume. The pre-chamber volume will thereby contain less gaseous medium compared to if the inlet port was arranged at the top end of the pre-chamber volume. The distance from the top end of the pre-chamber volume determines the amount of gaseous medium in the pre-chamber volume. Thus, the larger the distance, the more residual gases and the less gaseous medium in the pre-chamber volume. During compression, lean gas mixture will be pressed into the pre-chamber volume and the pressure of the cylinder piston results in that the lean gas mixture is mixed with the gaseous medium and the residual gases. The amount of gaseous medium in the pre-chamber volume will determine the air-fuel ratio of the gas mixture achieved when the lean gas mixture from the main combustion chamber enters the pre-chamber volume. By positioning the inlet port at a distance from the top end of the pre-chamber volume and thereby determining the amount of gaseous medium inside the pre-chamber volume, a desired air-fuel ratio of the gas mixture in the pre-chamber volume can be achieved.

According to an embodiment, at least an end portion of the inlet passage (that is, the portion of the inlet passage extending up to the inlet port) and the inlet port may be directed at least partly downwards into the pre-chamber volume, whereby the stream of gaseous medium gets directed more towards the bottom end of the pre-chamber volume during the intake stroke. This further contributes to leaving a volume of residual gases at the top end of the pre-chamber volume during the intake stroke. The wording "directed at least partly downwards" means in this context that at least the end portion of the inlet passage may extend e.g. obliquely downwards towards the inlet port and the pre-chamber volume and that the inlet port may e.g. be directed obliquely downwards into the pre-chamber volume.

The distance from the top end of the pre-chamber volume may depend on the amount of lean gas mixture from the main combustion chamber entering the pre-chamber volume. The distance from the top end of the pre-chamber volume may depend on the pressure of the cylinder piston during a compression stroke. The distance from the top end of the pre-chamber body may be within the range of ⅕-⅓ of the longitudinal extension of the pre-chamber volume.

In order to ensure that the same air-fuel ratio is achieved each time, an excessive amount of gaseous medium may be supplied, such that some of the gaseous medium leaks into the main combustion chamber via the openings in the pre-chamber body. This way, it is ensured that the pre-chamber volume is enough filled with the gaseous medium. The pre-chamber arrangement may thus be configured to supply an excess amount of gaseous medium, such that some of the gaseous medium leaks into the main combustion chamber via the openings in the pre-chamber body According to an example, the gaseous medium supplied via the inlet port into the pre-chamber volume is a rich fuel gas. The gaseous medium may be a natural gas or biogas. The gaseous medium may be methane.

The pre-chamber arrangement may further comprise a valve device configured to be arranged upstream of the inlet passage. The valve device may thus be configured to control the supply of gaseous medium into the pre-chamber volume. The valve device may comprise a check valve, configured to open and close depending on the pressure inside the pre-chamber volume. The valve device may thus be a passive valve. A passive valve does not need precise control and thereby facilitates the supply of gaseous medium. The feed pressure of the gaseous medium is the pressure, with which the gaseous medium is supplied into the pre-chamber volume. The feed pressure of the gaseous medium depends on the engine intake pressure and may be around 0.3 bar over the engine intake pressure. At maximum load on the engine, the feed pressure of the gaseous medium may be around 3 bar. During an intake stroke, the pressure in the main combustion chamber and the pre-chamber volume is lower than the feed pressure of the gaseous medium. The valve device will thereby open and gaseous medium will be supplied to the pre-chamber volume via the inlet port. During a compression stroke, the cylinder piston moves upwards towards the pre-chamber volume and presses the lean gas mixture into the pre-chamber volume with a pressure typically in the range of 20-40 bar. The pressure in the pre-chamber volume will thereby become higher than the feed pressure of the gaseous medium and the valve device will close. The supply of gaseous medium is thereby terminated. The valve device may thus be configured, such that it is open when the pressure inside the pre-chamber volume is lower than the feed pressure of the gaseous medium, and closed when the pressure inside the pre-chamber volume is higher than the feed pressure of the gaseous medium. The inlet passage may be extended, compared to prior art. The inlet passage may thus be an elongated passage extending away from the pre-chamber volume and the main combustion chamber. The inlet port is suitably at the end of the inlet passage leading into the pre-chamber volume. At the other end of the inlet passage, the valve device may be arranged. Arranging the valve device at a distance from the pre-chamber volume may be easier since it often is lack of space at the pre-chamber volume. The distance to the valve device may make it difficult to control the amount of supplied gaseous medium in a precise way. This is why an excess amount of gaseous medium may be supplied to allow leakage into the main combustion chamber. The valve device may thus be configured to supply an excess amount of gaseous medium, so that gaseous medium leak into the main combustion chamber. When the cylinder piston moves upwards during compression and the lean gas mixture in the main combustion chamber is pressed into the pre-chamber volume, the inlet passage may also allow lean gas mixture to be pressed up through the inlet passage to the valve device.

According to an example, the inlet port is positioned below the end of the spark plug inside the pre-chamber volume. This way, it is ensured that residual gases are surrounding the spark plug when gaseous medium is supplied into the pre-chamber volume. The inlet port may be positioned below the ignition point of the spark plug.

According to another example, the inlet port is positioned, such that 20-40% of the mass in the pre-chamber volume consists of the gaseous medium as the lean gas mixture from the main combustion chamber is pressed into the pre-chamber volume. The inlet port may thus be positioned to obtain a mass fraction of gaseous medium in the range of 20-40% during an intake stroke. In other words, 60-80% of the mass in the pre-chamber volume may consist of residual gases as the lean gas mixture from the main combustion chamber is pressed into the pre-chamber volume.

The pre-chamber arrangement may further comprise a supply channel configured to be arranged in fluid communication with a gaseous medium source and the inlet passage. The supply channel may be arranged in fluid communication with the inlet passage, via the valve device.

According to an example, the openings in the pre-chamber body are arranged, so as to provide a rotational movement of the gas entering the pre-chamber volume from the main combustion chamber. The pre-chamber body may have an essentially hemispherical shape at the bottom end. Alternatively, the pre-chamber body may have an essentially cylindrical shape at the bottom end. The pre-chamber body may thus comprise a bottom portion, which has an essentially hemispherical or cylindrical shape. Thus, the pre-chamber body may have a curved outer surface through which the openings extend. The curved outer surface may be referred to as convex, arched, curved or similar. The openings may be obliquely arranged in relation to a centre axis of the pre-chamber body. The openings may be obliquely arranged in relation to a radius of the pre-chamber body. This way, the gas from the main combustion chamber will obtain a rotational movement when it enters the pre-chamber volume.

According to an aspect of the present disclosure a gas engine is provided, the gas engine comprising at least one cylinder, wherein the gas engine further comprises a pre-chamber arrangement as disclosed herein. The gas engine may be of lean-burn type and the at least one cylinder may comprise an intake for a lean gas mixture. The gas engine may be configured for power generation. The gas engine may thus be configured to drive a generator, generating electrical power.

According to another aspect of the present disclosure, a method for combustion in a pre-chamber arrangement of a gas engine is provided. The pre-chamber arrangement comprises: a pre-chamber body accommodating a volume; and an inlet passage with an inlet port, for supplying a gaseous medium into the pre-chamber volume; wherein the pre-chamber volume extends in a longitudinal direction between a top end and a bottom end, wherein the pre-chamber volume is configured to accommodate an end of a spark plug at the top end and wherein, at the bottom end, the pre-chamber body comprises openings for allowing gas to flow between the pre-chamber volume and a main combustion chamber of the gas engine, wherein the inlet port is positioned, so as to reduce the amount of gaseous medium in the pre-chamber volume during an intake stroke. The method comprises: ensuring that gaseous medium is supplied into the pre-chamber volume during an intake stroke; ensuring that the gaseous medium is mixed with a lean gas mixture from the main combustion chamber during a compressions stroke; and igniting the gas mixture in the pre-chamber.

It will be appreciated that all the embodiments described for the arrangement aspect of the disclosure are also applicable to the method aspect. The method may thus comprise ensuring that an excess amount of gaseous medium is supplied into the pre-chamber volume, so that gaseous medium leaks into the main combustion chamber. The method may comprise ensuring that gaseous medium is supplied into the pre-chamber volume by means of a passive check valve. Furthermore, the method may comprise ensuring that the pre-chamber volume is filled with a desired (reduced) amount of gaseous medium during an intake stroke. The method may comprise ensuring that gaseous medium is supplied into the pre-chamber volume, such that a cushion of residual gases is maintained around the end of the spark plug.

According to yet another aspect of the invention, the use of a pre-chamber arrangement in a gas engine, is provided. The pre-chamber arrangement is configured as disclosed herein.

The present disclosure will now be further illustrated with reference to the appended figures.

Figure 1:
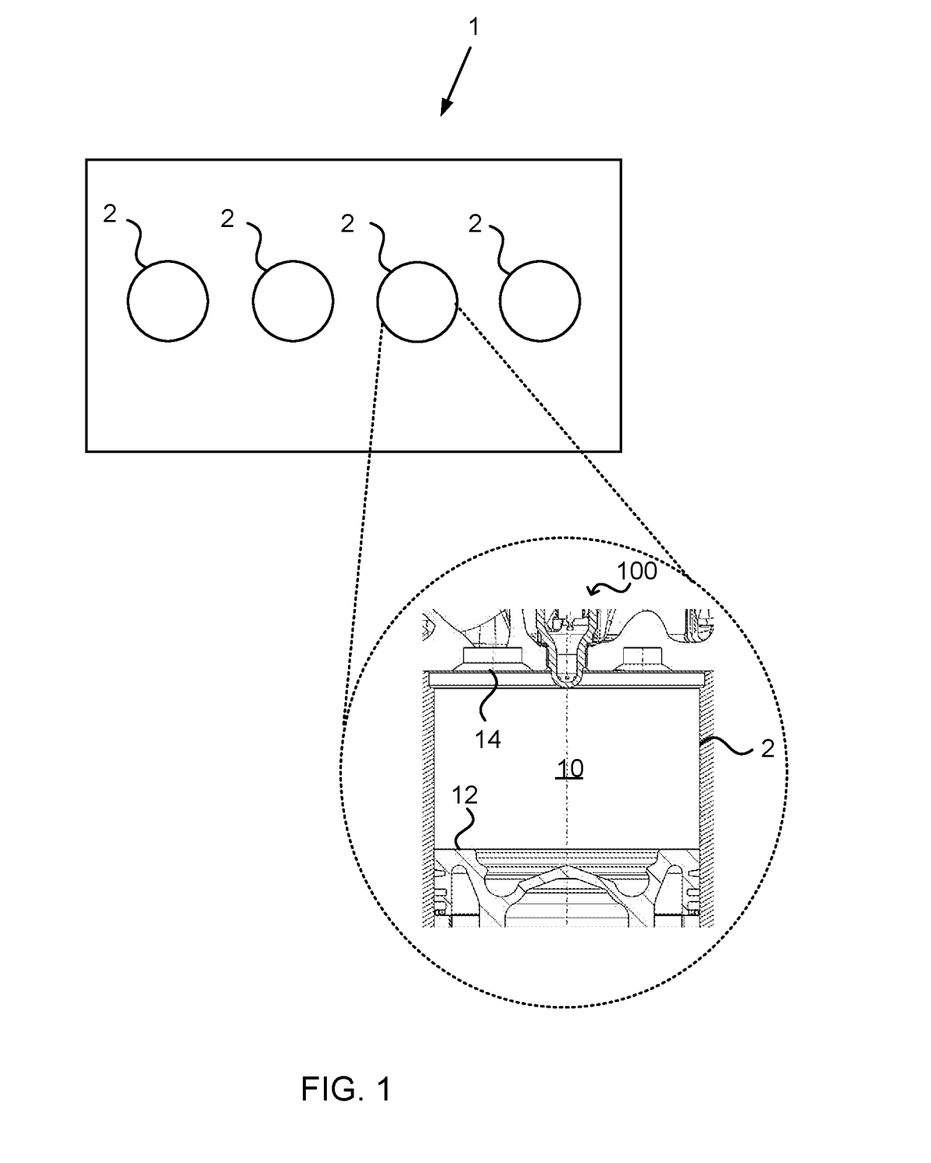
FIG. 1 schematically illustrates a gas engine according to an example.

FIG. 1 schematically shows a gas engine 1. Gas engine is considered to be a conventional term and thus means an engine operating on gaseous fuels. The gas engine 1 may be configured for power generation. The gas engine 1 may comprise at least one cylinder 2 and in this figure shows an example with four cylinders 2. Each cylinder 2 comprises a main combustion chamber 10 and a piston 12 movably arranged in said main combustion chamber 10. The gas engine 1 may also comprise a pre-chamber arrangement 100 arranged in fluid communication with the main combustion chamber 10 of each cylinder 2. The pre-chamber arrangement 100 may be referred to as a pre-combustion arrangement. The pre-chamber arrangement 100 is arranged to ignite a gas mixture, whereby the flaming gas and active components is spread into the main combustion chamber 10 to help burning a lean gas mixture in the cylinder main combustion chamber 10. Each cylinder 2 comprises an intake 14 for a lean gas mixture. The pre-chamber arrangement 100 will be further described in FIGS. 2a-2c and FIG. 3.

Figure 2A:
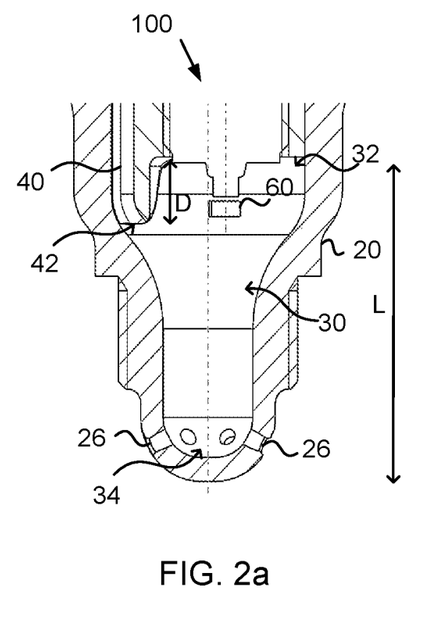
FIG. 2a-c schematically illustrates a pre-chamber arrangement according to an example.
Figure 2B:
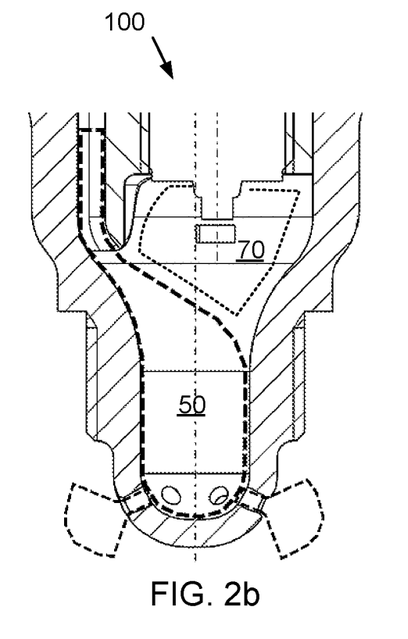
Figure 2C:
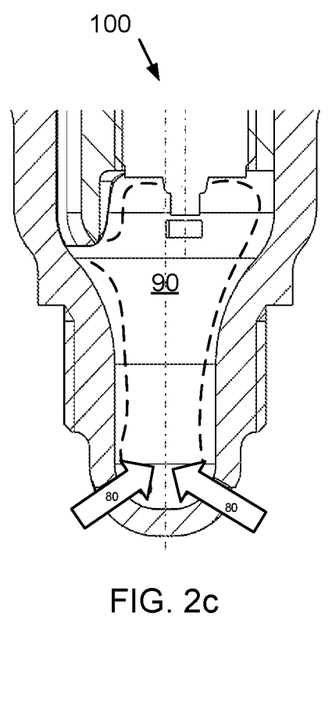

FIGS. 2a-2c schematically illustrates a pre-chamber arrangement 100 according to an example. The pre-chamber arrangement 100 is associated with a gas engine 1, and more specifically a gas engine cylinder 2, as disclosed in FIG. 1. FIG. 2a shows the configuration of the pre-chamber arrangement 100 and FIGS. 2b and 2c show the pre-chamber arrangement 100 as disclosed in FIG. 2a during different stages in the gas engine cylinder 2, which will be explained below. For clarity, the references to features of the pre-chamber arrangement 100 as disclosed in FIG. 2a may not be shown in FIGS. 2b and 2c. The pre-chamber arrangement 100 comprises: a pre-chamber body 20 accommodating a volume 30; and an inlet passage 40 with an inlet port 42, for supplying a gaseous medium 50 into the pre-chamber volume 30; wherein the pre-chamber volume 30 extends in a longitudinal direction L between a top end 32 and a bottom end 34, wherein the pre-chamber volume 30 is configured to accommodate an end of a spark plug 60 at the top end 32 and wherein, at the bottom end 34, the pre-chamber body 20 comprises openings 26 for allowing gas to flow between the pre-chamber volume 30 and the main combustion chamber 10 of the gas engine 1. Furthermore, the inlet port 42 is positioned, so as to reduce the amount of gaseous medium 50 in the pre-chamber volume 30 during an intake stroke. The inlet port 42 may be positioned at a distance D from the top end 32 of the pre-chamber volume 30, in the longitudinal direction L.

FIG. 2b illustrates the pre-chamber arrangement 100 as disclosed in FIG. 2a during an intake stroke. During an intake stroke, the pressure in the main combustion chamber 10 is lower than the feed pressure of the gaseous medium 50 and gaseous medium 50 is thereby supplied into the pre-chamber volume 30. The pressure in the main combustion chamber 10 will make the supplied gaseous medium 50 flow towards the bottom end 34 of the pre-chamber volume 30, and the openings 26 in the pre-chamber body 20. The gaseous medium 50 will thus have a limited flow upwards from the inlet port 42. Residual gases 70 from previous combustions will thereby be trapped at the top end 32 of the pre-chamber volume 30 and surround the end of the spark plug 60. The inlet port 42 may be positioned, such that a mass fraction of gaseous medium 50 in the range of 20-40% is obtained in the pre-chamber volume 30 during an intake stroke. An excessive amount of gaseous medium 50 may be supplied, such that some of the gaseous medium 50 leaks into the main combustion chamber 10 via the openings 26 in the pre-chamber body 20. This way, it is ensured that the pre-chamber volume 30 is enough filled with the gaseous medium 50. The distance D from the top end 32 of the pre-chamber volume 30 determines the amount of gaseous medium 50 in the pre-chamber volume 30. Thus, the larger the distance D, the more residual gases 70 and the less gaseous medium 50 in the pre-chamber volume 30. The inlet port 42 of the pre-chamber arrangement 100 may be positioned below the end of the spark plug 60 inside the pre-chamber volume 30.

FIG. 2c shows the pre-chamber arrangement 100 as disclosed in FIGS. 2a and 2b during a compression stroke. In a compression stroke, the cylinder piston 12 moves upwards and presses the lean gas mixture 80 in the main combustion chamber 10 into the pre-chamber volume 30 via the openings 26. This is illustrated with arrows. The residual gases 70, the gaseous medium 50 and the lean gas mixture 80 will this way be mixed in the pre-chamber volume 30 and a gas mixture/fuel charge 90 is thereby achieved in the pre-chamber volume 30. The gas mixture 90 in the pre-chamber volume 30 will get an air-fuel ratio depending on the amount of gaseous medium 50, the amount of residual gases 70 and the amount of lean gas mixture 80. Since the amount of gaseous medium 50 in the pre-chamber volume 30 varies depending on the position of the inlet port 42, the position of the inlet port 42 will affect the air-fuel ratio of the gas mixture/fuel charge 90 in the pre-chamber volume 30. Thus, by positioning the inlet port 42 at a distance D from the top end 32 of the pre-chamber volume 30 and thereby determining the amount of gaseous medium 50 inside the pre-chamber volume 30, a desired air-fuel ratio of the gas mixture 90 in the pre-chamber volume 30 can be achieved.

According to an example, the gaseous medium 50 is a rich fuel gas. The gaseous medium 50 may be a natural gas or biogas. The gaseous medium 50 may be methane.

Figure 3:
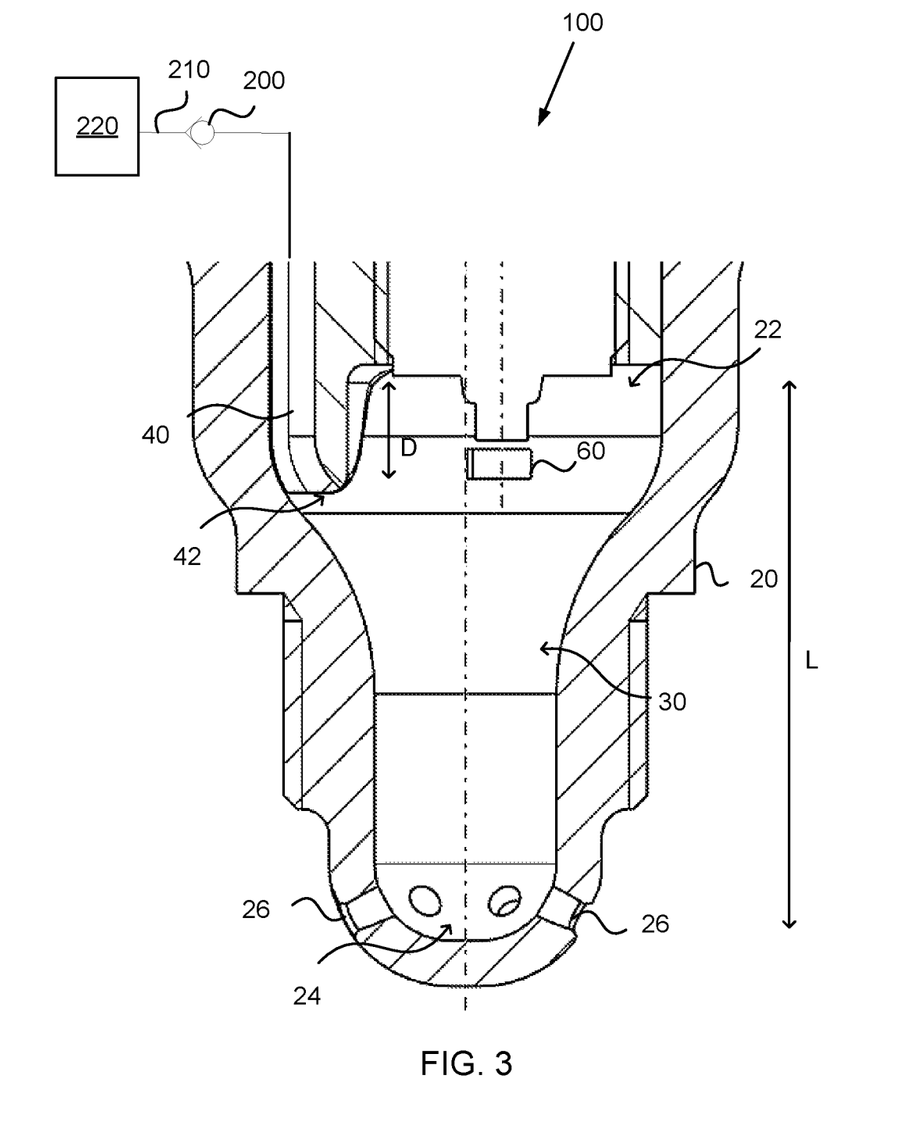
FIG. 3 schematically illustrates a pre-chamber arrangement according to an example.

FIG. 3 schematically illustrates a pre-chamber arrangement 100 according to an example. The pre-chamber arrangement 100 is associated with a gas engine 1, and more specifically a gas engine cylinder 2, as disclosed in FIG. 1. The pre-chamber arrangement 100 may be configured as disclosed in FIG. 2a-2c. In this example, the pre-chamber arrangement 100 further comprises a valve device 200 configured to be arranged upstream of the inlet passage 40. The valve device 200 may thus be configured to control the supply of gaseous medium 50 into the pre-chamber volume 30. The valve device 200 may be configured to supply gaseous medium 50 into the pre-chamber volume 30 during intake strokes.

The valve device 200 may comprise a check valve, configured to open and close depending on the pressure inside the pre-chamber volume 30. The valve device may thus be a passive valve. During an intake stroke, the pressure in the main combustion chamber 10 and the pre-chamber volume 30 is lower than the feed pressure of the gaseous medium 50. The valve device 200 will thereby open and gaseous medium 50 will be supplied to the pre-chamber volume 30 via the inlet port 42. The feed pressure of the valve device 200 may be around 3 bar. During a compression stroke, the pressure in the pre-chamber volume 30 is higher than the feed pressure of the valve device 200 and the valve device 200 will close. The supply of gaseous medium 50 is thereby terminated.

The inlet passage 40 of the pre-chamber arrangement 100 may be an elongated passage extending away from the pre-chamber volume 30 and the main combustion chamber 10. The inlet port 42 is suitably at the end of the inlet passage 40 leading into the pre-chamber volume 30. At the other end of the inlet passage 40, the valve device 200 may be arranged. When the cylinder piston 12 moves upwards during compression and the lean gas mixture 80 in the main combustion chamber 10 is pressed into the pre-chamber volume 30, the lean gas mixture 80 may also be pressed up through the inlet passage 40 to the valve device 200.

The pre-chamber arrangement 100 may further comprise a supply channel 210 configured to be arranged in fluid communication with a gaseous medium source 220 and the inlet passage 40. The supply channel 210 may be arranged in fluid communication with the inlet passage 40, via the valve device 200.

Figure 4:
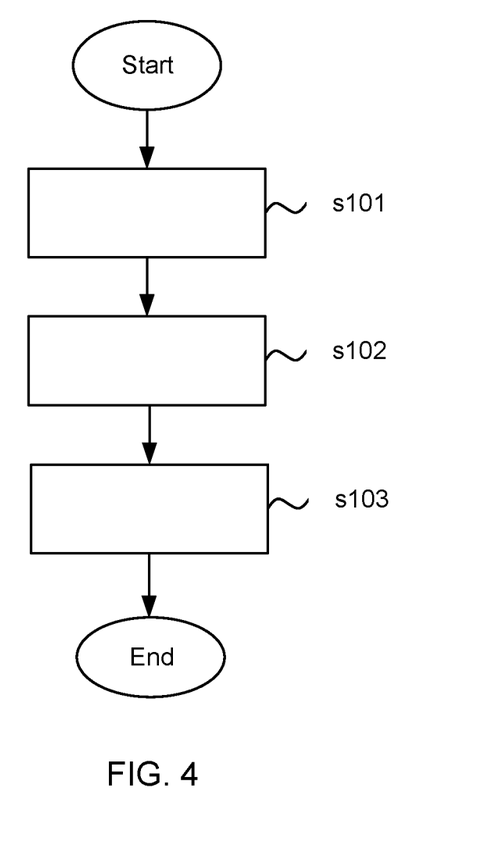
FIG. 4 illustrates a flow chart for a method according to an example.

FIG. 4 illustrates a flow chart for a method according to an example. The figure shows a flow chart for a method for combustion in a pre-chamber arrangement of a gas engine. The method thus relates to the gas engine 1 as disclosed in FIG. 1 and to the pre-chamber arrangement 100 as disclosed in FIG. 2a-2c and FIG. 3. The method comprises: ensuring s101 that gaseous medium 50 is supplied into the pre-chamber volume 30 during an intake stroke; ensuring s102 that the gaseous medium 50 is mixed with a lean gas mixture 80 from the main combustion chamber 10 during a compressions stroke; and igniting s103 the gas mixture 90 in the pre-chamber volume 30.

The step of ensuring s101 that gaseous medium 50 is supplied into the pre-chamber volume 30 during an intake stroke may be performed by means of a passive valve device 200. The step of ensuring s101 that gaseous medium 50 is supplied into the pre-chamber volume 30 during an intake stroke may comprise ensuring that an excess amount of gaseous medium 50 is supplied into the pre-chamber volume 30, so that gaseous medium 50 leaks into the main combustion chamber 10. Furthermore, the step of ensuring s101 that gaseous medium 50 is supplied into the pre-chamber volume 30 during an intake stroke may comprise ensuring that the pre-chamber volume 30 is filled with a desired (reduced) amount of gaseous medium 50 during an intake stroke. The step of ensuring s101 that gaseous medium 50 is supplied into the pre-chamber volume 30 during an intake stroke may comprise ensuring that gaseous medium 50 is supplied into the pre-chamber volume 30, such that a cushion of residual gases 70 is maintained at the top end 32 of the pre-chamber volume 30.

Ensuring s102 that the gaseous medium 50 is mixed with a lean gas mixture 80 from the main combustion chamber 10 during a compressions stroke may be performed by means of the openings 26 in the pre-chamber body 20.

Igniting s103 the gas mixture 90 in the pre-chamber volume 30 may be performed by means of the spark plug producing a small electric spark.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A pre-chamber arrangement for a gas engine, the arrangement comprising:
    a pre-chamber body accommodating a volume; and
    an inlet passage with an inlet port, for supplying a gaseous medium into the pre-chamber volume;
    wherein the pre-chamber volume extends in a longitudinal direction between a top end and a bottom end, wherein the pre-chamber volume is configured to accommodate an end of a spark plug at the top end and wherein, at the bottom end, the pre-chamber body comprises openings for allowing gas to flow between the pre-chamber volume and a main combustion chamber of the gas engine;
    the inlet port is positioned, at a distance from the top end of the pre-chamber volume, in the longitudinal direction, such that a volume of residual gases is trapped at the top end of the pre-chamber volume and surrounds the end of the spark plug when the gaseous medium is supplied into the pre-chamber volume during an intake stroke; and
    wherein at least an end portion of the inlet passage follows a contour of an interior surface of the pre-chamber body, wherein the end portion of the inlet passage and the inlet port are directed at least partly downwards into the pre-chamber volume.

2. The arrangement according to claim 1, wherein the gaseous medium supplied via the inlet port into the pre-chamber volume is a rich fuel gas.

3. The arrangement according to claim 1, wherein the arrangement further comprises:
   a valve device configured to be arranged upstream of the inlet passage.

4. The arrangement according to claim 3, wherein the valve device comprises a check valve, configured to open and close depending on the pressure inside the pre-chamber volume.

5. The arrangement according to claim 1, wherein the inlet port is positioned below the end of the spark plug inside the pre-chamber volume.

6. A pre-chamber arrangement for a gas engine, the arrangement comprising:
   a pre-chamber body accommodating a volume; and
   an inlet passage with an inlet port, for supplying a gaseous medium into the pre-chamber volume;
   wherein the pre-chamber volume extends in a longitudinal direction between a top end and a bottom end, wherein the pre-chamber volume is configured to accommodate an end of a spark plug at the top end and wherein, at the bottom end, the pre-chamber body comprises openings for allowing gas to flow between the pre-chamber volume and a main combustion chamber of the gas engine;
   the inlet port is positioned, at a distance from the top end of the pre-chamber volume, in the longitudinal direction, such that a volume of residual gases is trapped at the top end of the pre-chamber volume and surrounds the end of the spark plug when the gaseous medium is supplied into the pre-chamber volume during an intake stroke; and
   wherein the inlet port is positioned, such that a mass fraction of 20% to 40% of the gaseous medium supplied through the inlet port is obtained in the pre-chamber volume during an intake stroke.

7. The arrangement according to claim 1, further comprising:
   a supply channel configured to be arranged in fluid communication with a gaseous medium source and the inlet passage.

8. A gas engine, comprising at least one cylinder, wherein the gas engine further comprises a pre-chamber arrangement according to claim 1.

9. The gas engine according to claim 8, wherein the gas engine is configured for power generation.

* * * * *